United States Patent
Shama et al.

(10) Patent No.: US 11,783,083 B2
(45) Date of Patent: Oct. 10, 2023

(54) COMPUTING TRADE-OFFS BETWEEN PRIVACY AND ACCURACY OF DATA ANALYSIS

(71) Applicant: International Business Machines Corporation, Armonk, NY (US)

(72) Inventors: Wael Shama, Nof Hagalil (IL); Jonathan Bnayahu, Haifa (IL); Artem Barger, Haifa (IL); Eliezer Segev Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 17/206,712

(22) Filed: Mar. 19, 2021

(65) Prior Publication Data

US 2022/0300640 A1    Sep. 22, 2022

(51) Int. Cl.
*G06F 21/62* (2013.01)
*G06N 20/00* (2019.01)

(52) U.S. Cl.
CPC ......... *G06F 21/6245* (2013.01); *G06N 20/00* (2019.01)

(58) Field of Classification Search
CPC ..... G06N 20/00; G06N 20/20; G06F 21/6245
See application file for complete search history.

(56) References Cited

U.S. PATENT DOCUMENTS

| 7,318,051 | B2 | 8/2008 | Weston et al. |
| 8,737,709 | B2 | 5/2014 | Kamath et al. |
| 2015/0235051 | A1 | 8/2015 | Fawaz et al. |
| 2020/0311300 | A1 | 10/2020 | Callcut et al. |
| 2021/0295191 | A1* | 9/2021 | Bui ....................... G06V 10/751 |
| 2021/0360010 | A1* | 11/2021 | Zaccak .................. G06N 20/20 |

FOREIGN PATENT DOCUMENTS

WO    2013164281 A2    6/2013

OTHER PUBLICATIONS

"A method uses dynamic anonymization to protect customer sensitive data during analytics", Disclosed Anonymously, An IP.com Prior Art Database Technical Disclosure, IP.com No. IPCOM000249015D, IP.com Electronic Publication Date: Jan. 26, 2017, 7 pages, <https://priorart.ip.com/IPCOM/000249015>.

(Continued)

*Primary Examiner* — Olugbenga O Idowu
(74) *Attorney, Agent, or Firm* — Edward J. Wixted, III

(57) ABSTRACT

In an approach for computing trade-offs between privacy and accuracy of data analysis on building a learning model, a processor receives a dataset for training a model. The dataset includes one or more pre-identified sensitive data fields. The processor determines a weight of each sensitive data field for the model. The processor evaluates resource cost of applying a privacy preservation technique to the one or more pre-identified sensitive data fields. The processor identifies correlation among the sensitive data fields. The processor presents a comparison of options for training the model, in terms of tradeoffs of accuracy for training the model and the resource cost of the privacy preservation technique.

20 Claims, 6 Drawing Sheets

| Sensitivity | | | | | |
|---|---|---|---|---|---|
| | F1 | F2 | F3 | F4 | F5 |
| | 0 | 0.1 | 0.5 | 1 | 1 |

| Features Weight | | | | | |
|---|---|---|---|---|---|
| | 0.65 | 0.3 | 0.4 | 0.9 | 0.1 |

(56) References Cited

OTHER PUBLICATIONS

Agarwal, Sushant, "Trade-Offs between Fairness, Interpretability, and Privacy in Machine Learning", A thesis presented to the University of Waterloo in fulfillment of the thesis requirement for the degree of Master of Mathematics in Computer Science, Waterloo, Ontario, Canada, 2020, 41 pages, <https://cs.uwaterloo.ca/~s34agarw/thesis>.

Aldeen et al., "A comprehensive review on privacy preserving data mining", SpringerPlus vol. 4, 694, Nov. 15, 2015, 36 pages, <https://doi.org/10.1186/s40064-015-1481-x>.

Rao et al., "Privacy preservation techniques in big data analytics: a survey", Journal of Big Data, vol. 5:33, 2018, 12 pages, <https://journalofbigdata.springeropen.com/articles/10.1186/s40537-018-0141-8>.

Yang et al., "The Tradeoff Between Privacy and Accuracy in Anomaly Detection Using Federated XGBoost", Cornell University, arXiv:1907.07157, Jul. 16, 2019, 7 pages, <https://arxiv.org/pdf/1907.07157.pdf>.

Mell et al., "The NIST Definition of Cloud Computing", Recommendations of the National Institute of Standards and Technology, Special Publication 800-145, Sep. 2011, 7 pages.

\* cited by examiner

COMPUTING TRADE-OFFS BETWEEN PRIVACY AND ACCURACY OF DATA ANALYSIS

BACKGROUND

The present disclosure relates generally to the field of data analysis, and more particularly to computing trade-offs between privacy and accuracy of data analysis on building a learning model.

Incredible amounts of data are generated by various organizations like hospitals, banks, e-commerce, retail and supply chain, etc. by virtue of digital technology. Not only humans but machines also contribute to data in the form of closed-circuit television streaming, web site logs, etc. Data may be generated every minute by social media and smart phones. The voluminous data generated from the various sources can be processed and analyzed to support decision making. However, data analytics is prone to privacy violations. Although data analytics is useful in decision making, it will lead to serious privacy concerns. Privacy preserving data analytics has become very important. Privacy is the ability of an individual to determine what data can be shared, and employ access control. If the data is in a public domain then it is a threat to individual privacy as the data is held by a data holder. Data holders can be social networking applications, websites, mobile apps, ecommerce sites, banks, hospitals, etc. It is the responsibility of the data holder to ensure privacy of the users data. When building a model based on data originating from multiple sources, it often involves certain elements that cannot be shared in an original form between parties. For example, these certain elements could be personally identifying information or represent private health information. In other cases, the certain elements may capture business-sensitive details, such as cost and inventory.

SUMMARY

Aspects of an embodiment of the present disclosure disclose an approach for computing trade-offs between privacy and accuracy of data analysis on building a learning model. The processor receives a dataset for training a model. The dataset includes one or more pre-identified sensitive data fields. The processor determines a weight of each sensitive data field for the model. The processor evaluates resource cost of applying a privacy preservation technique to the one or more pre-identified sensitive data fields. The processor identifies correlation among the sensitive data fields. The processor presents a comparison of options for training the model, in terms of tradeoffs of accuracy for training the model and the resource cost of the privacy preservation technique.

DETAILED DESCRIPTION

Figure 1:
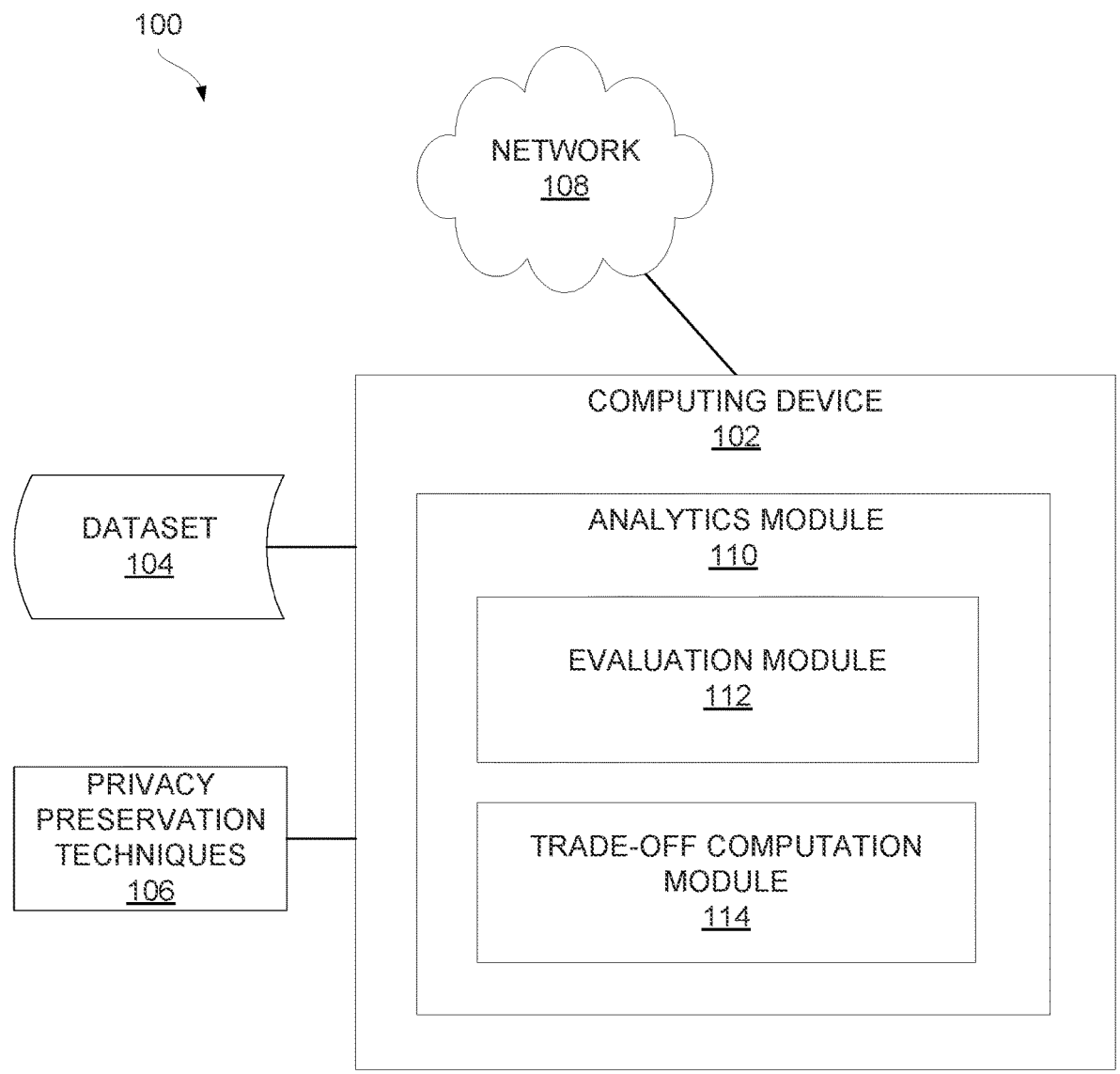
FIG. 1 is a functional block diagram illustrating a privacy trade-off analytics environment, in accordance with an embodiment of the present disclosure.

The present disclosure is directed to systems and methods for computing trade-offs between privacy and accuracy of data analysis on building a learning model.

Embodiments of the present disclosure recognize a need for protecting privacy information in the design of analytics models over data originating from multiple sources, especially considering data including sensitive elements (e.g., personally identifying or business sensitive information). Embodiments of the present disclosure disclose evaluating and comparing different privacy preservation techniques over several dimensions: level of privacy, accuracy of the model and execution cost. Embodiments of the present disclosure disclose getting a sample of the data or simulated sample, annotation on the private information in the data, and the analytics to run as input. Embodiments of the present disclosure disclose running the analytics both on the input data and on the input data using a variety of privacy preserving techniques. Embodiments of the present disclosure disclose outputting both the various accuracies of the different runs, data about the privacy metrics achieved and non-functional requirements of the different privacy preserving techniques such as computational footprint, enabling a user to carry out the required trade-off analysis. Embodiments of the present disclosure disclose excluding sensitive data fields from the data sets when other data fields are sufficiently well correlated to the sensitive data fields.

Embodiments of the present disclosure disclose data analysis on applying privacy preserving techniques to protect privacy information in building a learning model. Different privacy preserving techniques may support varying levels of privacy and may have varying impact on accuracy as well as significant non-functional requirements. Embodiments of the present disclosure disclose allowing to evaluate different privacy preservation techniques when applied to sensitive data features and to compare functional and non-functional implications of each technique in a summarized manner. Embodiments of the present disclosure disclose a comparison of privacy, accuracy and cost dimensions (in terms or resource requirements). Embodiments of the present disclosure disclose allowing a user to choose an appropriate balance between these dimensions as fitting a task.

Embodiments of the present disclosure disclose computation of trade-offs between multiple privacy preserving techniques, such as data masking, use of correlated features, and others, in terms of the degree of privacy achieved and in terms of the impact on the model's accuracy and resource requirements (e.g., cost). Embodiments of the present disclosure disclose an analytic is run through various privacy preserving techniques. Such techniques may include simple techniques like completely excluding some columns, as well as more complex techniques such as securing multi-party computation and differential privacy. Embodiments of the present disclosure disclose analyzing the resulting tradeoffs and presenting, both in terms of tradeoffs in accuracy, as well as tradeoffs in terms of computational resources and speed of computation. Embodiments of the present disclosure disclose identifying correlation between features (potentially less accurate correlated features) considering importance and sensitivity (e.g. confidentiality, weight of features, accuracy level, encryption needed). Embodiments of the present disclosure disclose a machine learning model to predict correlated features and to present accuracy, resource requirements or other comparable options between privacy preserving techniques. Embodiments of the present disclosure disclose specifying correlation between parameters that some parameters may be replaced with linear combination of others. For example, features that has been declared as most sensitive ones can be replaced with less sensitive ones and may proceed with the training of the learning model. Correlation between features in dataset may represent certain degree of redundancy. For example, parameters can be replaced with linear combination without compromising precision.

The present disclosure will now be described in detail with reference to the Figures. FIG. 1 is a functional block diagram illustrating privacy trade-off analytics environment, generally designated 100, in accordance with an embodiment of the present disclosure.

In the depicted embodiment, privacy trade-off analytics environment 100 includes computing device 102, dataset 104, privacy preservation techniques 106, and network 108. In one or more embodiments, dataset 104 may be a sample of the data or simulated sample as input to train a model. Dataset 104 may include sensitive data fields. Sensitive data fields may include personally-identifying information, private health information, and business sensitive information. Sensitive data fields may include other sensitive data information. Dataset 104 may originate from multiple sources. Dataset 104 may contain certain elements (e.g., sensitive data fields) that cannot be shared in an original form between parties. For example, sensitive data fields could be personally identifying information or represent private health information. In other cases, sensitive data fields may be business-sensitive details, such as cost and inventory.

In one or more embodiments, privacy preservation techniques 106 may be various techniques (e.g., anonymization, homomorphic encryption) to sensitive data fields in dataset 104 to protect private information. Privacy preservation techniques 106 may be as input to analytics module 110 to evaluate resource cost of privacy preservation techniques 106 applied to pre-identified sensitive data fields in dataset 104. The resource cost of privacy preservation techniques 106 may be associated with computational resources and speed of computation of applying the privacy preservation techniques to the pre-identified sensitive data fields. Analytics module 110 may run through various privacy preserving techniques 106. Privacy preservation techniques 106 may include excluding some columns of the sensitive data fields. Privacy preservation techniques 106 may include securing multi-party computation and differential privacy. Analytics module 110 may support varying levels of privacy and may have varying impact on accuracy as well as significant non-functional requirements. Analytics module 110 may evaluate different privacy preservation techniques when applied to the sensitive data features and may compare the functional and non-functional implications of each technique in a summarized manner. For example, the comparison may include the privacy, accuracy and cost dimensions (in terms or resource requirements). Analytics module 110 may allow the user to choose an appropriate balance between these dimensions as fitting the task at hand. Analytics module 110 may provide a specific implementation of a simple privacy preserving technique that can be used in this context, and the specific implementation may be easily understandable by a user.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to analytics module 110 and network 108 and is capable of processing program instructions and executing analytics module 110, in accordance with an embodiment of the present disclosure. Computing device 102 may include internal and external hardware components, as depicted and described in further detail with respect to FIG. 4.

Further, in the depicted embodiment, computing device 102 includes analytics module 110. In the depicted embodiment, analytics module 110 is located on computing device 102. However, in other embodiments, analytics module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and analytics module 110, in accordance with a desired embodiment of the disclosure.

In one or more embodiments, analytics module 110 is configured to receive dataset 104 for training a model. Dataset 104 may be a sample of the data or simulated sample as input to train the model. Dataset 104 may include sensitive data fields. Sensitive data fields may include personally-identifying information, private health information, and business sensitive information. Sensitive data fields may include other sensitive data information. Dataset 104 may originate from multiple sources. Dataset 104 may contain certain elements (e.g., sensitive data fields) that cannot be shared in an original form between parties. For example, sensitive data fields could be personally identifying information or represent private health information. In other cases, sensitive data fields may be business-sensitive details, such as cost and inventory. Sensitive data fields may be pre-identified by a user. A sensitivity level for each sensitive data field can be defined as in a range between 0 and 1, where 0 is the least sensitive (e.g., public data) and 1 is the most sensitive. Analytics module 110 may rank features that may affect prediction by a sensitivity level. Analytics module 110 may define a sensitivity threshold. Analytics module 110 may analyze dataset 104 together with an indication of which data fields are sensitive. Analytics module 110 may evaluate and compare different privacy preservation techniques 106 over several dimensions: level of privacy, accuracy of the model and execution cost.

In one or more embodiments, analytics module 110 is configured to determine a weight of each sensitive data field for training the model, e.g., in a random forest model, the level in the decision trees where these fields are used. Analytics module 110 may use regression coefficients to determine the weight of the features (e.g., sensitive data fields). Analytics module 110 may compute each feature by a value based on sensitivity multiplied by the weight. An example of determining the weight of the features is depicted and described in further detail with respect to FIG. 3.

In one or more embodiments, analytics module 110 is configured to evaluate resource cost of applying a plurality of privacy preservation techniques 106 to the one or more pre-identified sensitive data fields in dataset 104. Analytics module 110 may estimate resource cost of applying different privacy preservation techniques 106. The resource cost of privacy preservation techniques 106 may be associated with computational resources and speed of computation of applying the privacy preservation techniques to the pre-identified sensitive data fields. Analytics module 110 may run through various privacy preserving techniques 106. Privacy preservation techniques 106 may include excluding some columns of the sensitive data fields. Privacy preservation techniques 106 may include securing multi-party computation and differential privacy. Analytics module 110 may apply various techniques (e.g., anonymization, homomorphic encryption) to sensitive data fields to protect private information. Analytics module 110 may support varying levels of privacy and may have varying impact on accuracy as well as significant non-functional requirements. A user in the model design process may be a data scientist, a business owner, an engineer, a compliance personnel or other suitable user. Analytics module 110 may analyze various alternatives and make informed decision about the appropriate course of action for the user. Analytics module 110 may evaluate different privacy preservation techniques when applied to the sensitive data features and may compare the functional and non-functional implications of each technique in a summarized manner. For example, the comparison may include the privacy, accuracy and cost dimensions (in terms or resource requirements). Analytics module 110 may allow the user to choose an appropriate balance between these dimensions as fitting the task at hand. Analytics module 110 may provide a specific implementation of a simple privacy preserving technique that can be used in this context, and the specific implementation may be easily understandable by a user.

In one or more embodiments, analytics module 110 is configured to identify correlation among the sensitive data fields in dataset 104. Analytics module 110 may rank the sensitive data fields based on the correlation. Analytics module 110 may identify correlated data fields and may rank the correlated data fields by how correlated the fields are to the sensitive fields. Analytics module 110 may identify correlation between features (potentially less accurate correlated features) considering the importance and sensitivity (e.g. confidential, "weight" of features, accuracy level, encryption needed). Analytics module 110 may predict correlated features and may present accuracy, resource requirements or other comparable options between techniques. Analytics module 110 may specify correlation between parameters for replacing some parameters with linear combination of others. For example, analytics module 110 may replace features that has been declared as most sensitive ones and may proceed with the training of the model. Analytics module 110 may utilize the fact that correlation between features in dataset 104 represents certain degree of redundancy. For example, analytics module 110 may replace parameters with linear combination without compromising precision. Analytics module 110 may perform analysis both on dataset 104 as input using a variety of privacy preserving techniques.

In one or more embodiments, analytics module 110 is configured to present a comparison of options, in terms of tradeoffs of accuracy for training the model and the resource cost of the privacy preservation techniques. Analytics module 110 may present a comparison of options in terms of accuracy and resource use. Analytics module 110 may replace features that has been declared as more sensitive ones with less sensitive ones. Analytics module 110 may proceed with the training of the model without compromising precision of training the model. Analytics module 110 may analyze the resulting tradeoffs and may present the tradeoffs in terms of accuracy, as well as computational resources and speed of computation. Analytics module 110 may output both the various accuracies of the different runs, data about the privacy metrics achieved and non-functional requirements of the different privacy preserving techniques such as computational footprint, and may enable the user to carry out the required trade off analysis. Analytics module 110 may include an embodiment of one such privacy preserving techniques, e.g., excluding sensitive fields completely from the data sets when other fields are sufficiently well correlated to the data sets. Analytics module 110 may compute the tradeoffs among different privacy preservation methods in order to be able to decide which privacy preservation method to choose and assess feasibility of each privacy preservation method to obtain desired accuracy level without compromising sensitive information. Analytics module 110 may compute tradeoffs between different techniques in order to allow for a user to decide which technique is more suitable for the user given privacy considerations and level of accuracy that the user would like to achieve. Analytics module 110 may find a fit privacy preserving technique based on customer requirements. Analytics module 110 may evaluate and compare different privacy preservation techniques over several dimensions, for example, level of privacy, accuracy of the model and execution cost. Analytics module 110 may compute tradeoffs between multiple privacy-preserving techniques, such as data masking, use of correlated features, and other techniques, in terms of the degree of privacy achieved and in terms of the impact on the model's accuracy and resource requirements (e.g., cost).

In the depicted embodiment, analytics module 110 includes evaluation module 112 and trade-off computation module 114. In one or more embodiments, evaluation module 112 is configured to evaluate resource cost of applying a plurality of privacy preservation techniques 106 to the one or more pre-identified sensitive data fields in dataset 104. Evaluation module 112 may estimate resource cost of applying different privacy preservation techniques 106. The resource cost of privacy preservation techniques 106 may be associated with computational resources and speed of computation of applying the privacy preservation techniques to the pre-identified sensitive data fields. Privacy preservation techniques 106 may include excluding some columns of the sensitive data fields. Privacy preservation techniques 106 may include securing multi-party computation and differential privacy. Evaluation module 112 may support varying levels of privacy and may have varying impact on accuracy as well as significant non-functional requirements. Evaluation module 112 may analyze various alternatives and make informed decision about the appropriate course of action for a user. Evaluation module 112 may evaluate different privacy preservation techniques when applied to the sensitive data features and may compare the functional and non-functional implications of each technique in a summarized manner. For example, the comparison may include the privacy, accuracy and cost dimensions (in terms or resource requirements). Evaluation module 112 may allow the user to choose an appropriate balance between these dimensions as fitting the task at hand. Evaluation module 112 may provide a specific implementation of a simple privacy preserving technique that can be used in this context, and the specific implementation may be easily understandable by a user.

In one or more embodiments, trade-off computation module 114 is configured to compute trade-offs between privacy and accuracy of data analysis on building a learning model. Trade-off computation module 114 may identify correlation among sensitive data fields in dataset 104. Trade-off computation module 114 may rank the sensitive data fields based on the correlation. Trade-off computation module 114 may rank the correlated data fields by how correlated the fields are to the sensitive fields. Trade-off computation module 114 may identify correlation between features (potentially less accurate correlated features) considering the importance and sensitivity (e.g. confidential, "weight" of features, accuracy level, encryption needed). Trade-off computation module 114 may predict correlated features and may present accuracy, resource requirements or other comparable options between techniques. Trade-off computation module 114 may specify correlation between parameters for replacing some parameters with linear combination of others. For example, Trade-off computation module 114 may replace features that has been declared as most sensitive ones and may proceed with the training of the model. Trade-off computation module 114 may utilize the fact that correlation between features in dataset 104 represents certain degree of redundancy. For examples, trade-off computation module 114 may replace parameters with linear combination without compromising precision. Trade-off computation module 114 may perform analysis both on dataset 104 as input using a variety of privacy preserving techniques. Trade-off computation module 114 may present a comparison of options, in terms of tradeoffs of accuracy for training the model and the resource cost of the privacy preservation techniques. Trade-off computation module 114 may analyze the resulting tradeoffs and may present the tradeoffs in terms of accuracy, as well as computational resources and speed of computation. Trade-off computation module 114 may output both the various accuracies of the different runs, data about the privacy metrics achieved and non-functional requirements of the different privacy preserving techniques such as computational footprint, and may enable the user to carry out the required trade off analysis. Trade-off computation module 114 may compute the tradeoffs among different privacy preservation methods in order to be able to decide which one to choose and assess feasibility of each to obtain desired accuracy level without compromising sensitive information. Trade-off computation module 114 may compute tradeoffs between different techniques in order to allow for a user to decide which technique is more suitable for the user given privacy considerations and level of accuracy that the user would like to achieve. Trade-off computation module 114 may find a fit privacy preserving technique based on customer requirements. Trade-off computation module 114 may compute tradeoffs between multiple privacy-preserving techniques, such as data masking, use of correlated features, and other techniques, in terms of the degree of privacy achieved and in terms of the impact on the model's accuracy and resource requirements (e.g., cost).

Figure 2:
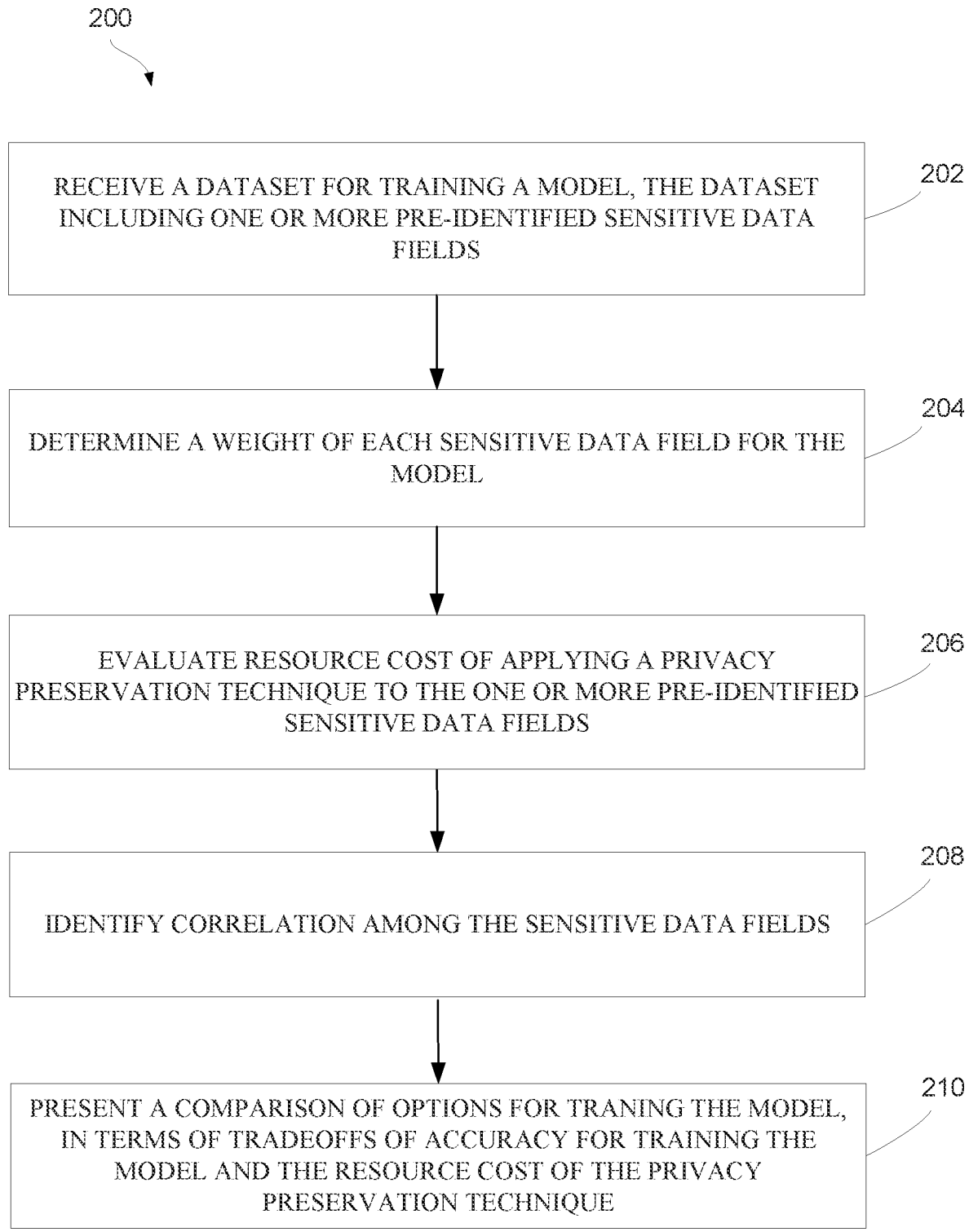
FIG. 2 is a flowchart depicting operational steps of an analytics module within a computing device of FIG. 1, in accordance with an embodiment of the present disclosure.

FIG. 2 is a flowchart 200 depicting operational steps of analytics module 110 in accordance with an embodiment of the present disclosure.

Analytics module 110 operates to receive dataset 104 for training a model. Dataset 104 may be a sample of the data or simulated sample as input to train the model. Dataset 104 may include sensitive data fields. Analytics module 110 also operates to determine a weight of each sensitive data field for training the model. Analytics module 110 operates to evaluate resource cost of applying a plurality of privacy preservation techniques 106 to the one or more pre-identified sensitive data fields in dataset 104. Analytics module 110 operates to identify correlation among the sensitive data fields in dataset 104. Analytics module 110 operates to present a comparison of options, in terms of tradeoffs of accuracy for training the model and the resource cost of the privacy preservation techniques.

In step 202, analytics module 110 receives dataset 104 for training a model. Dataset 104 may be a sample of the data or simulated sample as input to train the model. Dataset 104 may include sensitive data fields. Dataset 104 may include combination of sensitive data fields. Sensitive data fields may include personally-identifying information, private health information, and business sensitive information. Sensitive data fields may include other sensitive data information. Dataset 104 may originate from multiple sources. Dataset 104 may contain certain elements (e.g., sensitive data fields) that cannot be shared in an original form between parties. For example, sensitive data fields could be personally identifying information or represent private health information. In other cases, sensitive data fields may be business-sensitive details, such as cost and inventory. Sensitive data fields may be pre-identified by a user. A sensitivity level for each sensitive data field can be defined as in a range between 0 and 1, where 0 is the least sensitive (e.g., public data) and 1 is the most sensitive. Analytics module 110 may rank features that may affect prediction by a sensitivity level. Analytics module 110 may define a sensitivity threshold. Analytics module 110 may analyze dataset 104 together with an indication of which data fields are sensitive. Analytics module 110 may evaluate and compare different privacy preservation techniques 106 over several dimensions: level of privacy, accuracy of the model and execution cost.

In step 204, analytics module 110 determines a weight of each sensitive data field for training the model, e.g., in a random forest model, the level in the decision trees where these fields are used. Analytics module 110 may use regression coefficients to determine the weight of the features (e.g., sensitive data fields). Analytics module 110 may compute each feature by a value based on sensitivity multiplied by the weight. An example of determining the weight of the features is depicted and described in further detail with respect to FIG. 3.

In step 206, analytics module 110 evaluates resource cost of applying a plurality of privacy preservation techniques 106 to the one or more pre-identified sensitive data fields in dataset 104. Analytics module 110 may estimate resource cost of applying different privacy preservation techniques 106. The resource cost of privacy preservation techniques 106 may be associated with computational resources and speed of computation of applying the privacy preservation techniques to the pre-identified sensitive data fields. Analytics module 110 may run through various privacy preserving techniques 106. Privacy preservation techniques 106 may include excluding some columns of the sensitive data fields. Privacy preservation techniques 106 may include securing multi-party computation and differential privacy. Analytics module 110 may apply various techniques (e.g., anonymization, homomorphic encryption) to sensitive data fields to protect private information. Analytics module 110 may support varying levels of privacy and may have varying impact on accuracy as well as significant non-functional requirements. A user in the model design process may be a data scientist, a business owner, an engineer, a compliance personnel or other suitable user. Analytics module 110 may analyze various alternatives and make informed decision about the appropriate course of action for the user. Analytics module 110 may evaluate different privacy preservation techniques when applied to the sensitive data features and may compare the functional and non-functional implications of each technique in a summarized manner. For example, the comparison may include the privacy, accuracy and cost dimensions (in terms or resource requirements). Analytics module 110 may allow the user to choose an appropriate balance between these dimensions as fitting the task at hand. Analytics module 110 may provide a specific implementation of a simple privacy preserving technique that can be used in this context, and the specific implementation may be easily understandable by a user.

In step 208, analytics module 110 identifies correlation among the sensitive data fields in dataset 104. Analytics module 110 may rank the sensitive data fields based on the correlation. Analytics module 110 may identify correlated data fields and may rank the correlated data fields by how correlated the fields are to the sensitive fields. Analytics module 110 may identify correlation between features (potentially less accurate correlated features) considering the importance and sensitivity (e.g. confidential, "weight" of features, accuracy level, encryption needed). Analytics module 110 may predict correlated features and may present accuracy, resource requirements or other comparable options between techniques. Analytics module 110 may specify correlation between parameters for replacing some parameters with linear combination of others. For example, analytics module 110 may replace features that has been declared as most sensitive ones and may proceed with the training of the model. Analytics module 110 may utilize the fact that correlation between features in dataset 104 represents certain degree of redundancy. For examples, analytics module 110 may replace parameters with linear combination without compromising precision. Analytics module 110 may perform analysis both on dataset 104 as input using a variety of privacy preserving techniques.

In step 210, analytics module 110 presents a comparison of options, in terms of tradeoffs of accuracy for training the model and the resource cost of the privacy preservation techniques. Analytics module 110 may present a comparison of options in terms of accuracy and resource use. Analytics module 110 may replace features that has been declared as more sensitive ones with less sensitive ones. Analytics module 110 may proceed with the training of the model without compromising precision of training the model. Analytics module 110 may analyze the resulting tradeoffs and may present the tradeoffs in terms of accuracy, as well as computational resources and speed of computation. Analytics module 110 may output both the various accuracies of the different runs, data about the privacy metrics achieved and non-functional requirements of the different privacy preserving techniques such as computational footprint, and may enable the user to carry out the required trade off analysis. Analytics module 110 may include an embodiment of one such privacy preserving techniques, e.g., excluding sensitive fields completely from the data sets when other fields are sufficiently well correlated to the data sets. Analytics module 110 may compute the tradeoffs among different privacy preservation methods in order to be able to decide which one to choose and assess feasibility of each to obtain desired accuracy level without compromising sensitive information. Analytics module 110 may compute tradeoffs between different techniques in order to allow for a user to decide which technique is more suitable for the user given privacy considerations and level of accuracy that the user would like to achieve. Analytics module 110 may find a fit privacy preserving technique based on customer requirements. Analytics module 110 may evaluate and compare different privacy preservation techniques over several dimensions, for example, level of privacy, accuracy of the model and execution cost. Analytics module 110 may compute tradeoffs between multiple privacy-preserving techniques, such as data masking, use of correlated features, and other techniques, in terms of the degree of privacy achieved and in terms of the impact on the model's accuracy and resource requirements (e.g., cost).

Figure 3:
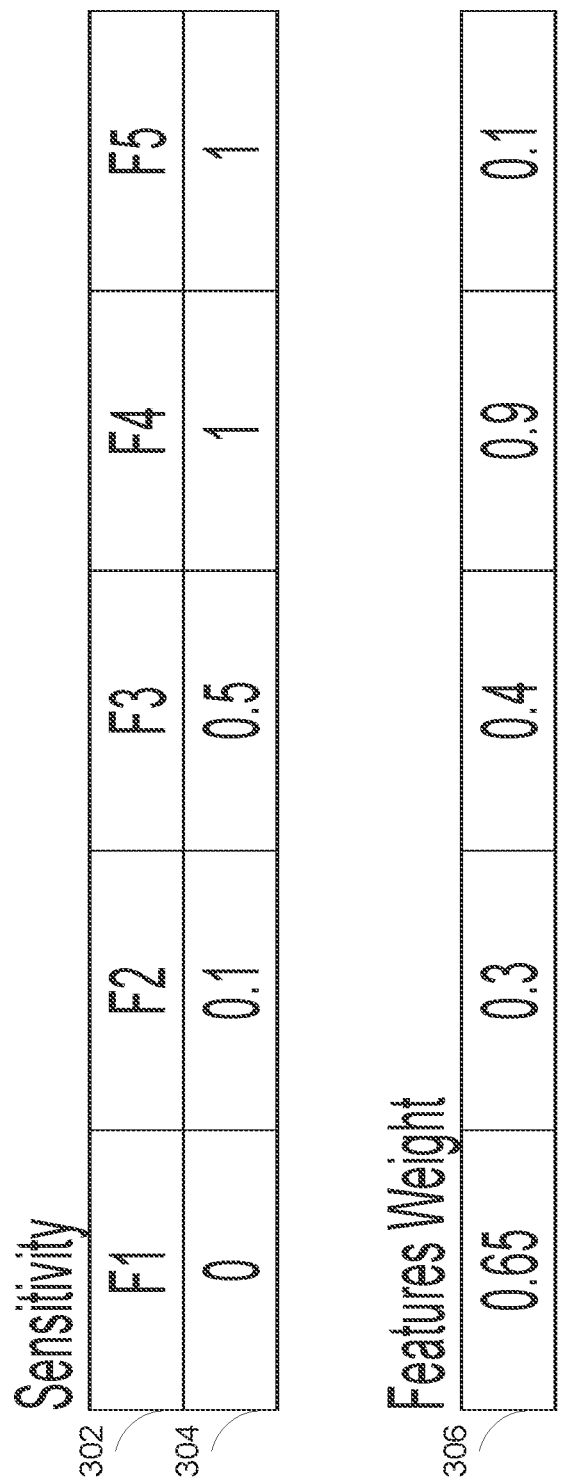
FIG. 3 illustrates an exemplary function of the analytics module 110 within the computing device of FIG. 1, in accordance with an embodiment of the present disclosure.

FIG. 3 illustrates an exemplary function of analytics module 110 in accordance with one or more embodiments of the present disclosure.

In the example of FIG. 3, sensitivity level 304 for each feature 302 (e.g., data field) for building a learning model can be defined as in range between 0 and 1, where 0 is the least sensitive (e.g., public data) and 1 is the most sensitive. For example, a user can pre-define sensitivity level 304 for feature F1 as 0, feature F2 as 0.1, feature F3 as 0.5, feature F4 as 1, and feature F5 as 1 based on the sensitivity of each feature 302. Analytics module 110 may determine weight 306 of each feature 302 (e.g., data field) for training a model, e.g., in a random forest model, the level in the decision trees where these fields are used. Analytics module 110 may use regression coefficients to determine weight 306 of each feature 302. For example, analytics module 110 may determine weight 306 of each feature 302 based on the regression coefficients, e.g., Pearson correlation coefficients, Pearson product moment coefficients, and other coefficients. Analytics module 110 may compute each feature 302 by a value based on sensitivity level 304 multiplied by weight 306. Analytics module 110 may rank each feature 302 that may affect prediction by sensitivity level 304. Analytics module 110 may define a sensitivity threshold. Analytics module 110 may define a sensitive feature as a feature that is above the sensitive threshold. Analytics module 110 may loop on sensitive features (ordered by feature values). Analytics module 110 may identify correlated fields with regression coefficients. Analytics module 110 may store correlated fields and rank the correlated fields by correlation factors. If analytics module 110 determines all correlated fields below the sensitive threshold and not null, analytics module 110 may return the sensitive feature and the correlated fields. If analytics module 110 determines all correlated fields are below the sensitive threshold, analytics module 110 may run algorithm on sensitive fields without the feature. Analytics module 110 may analyze dataset 104 together with an indication of which data fields are sensitive.

Figure 4:
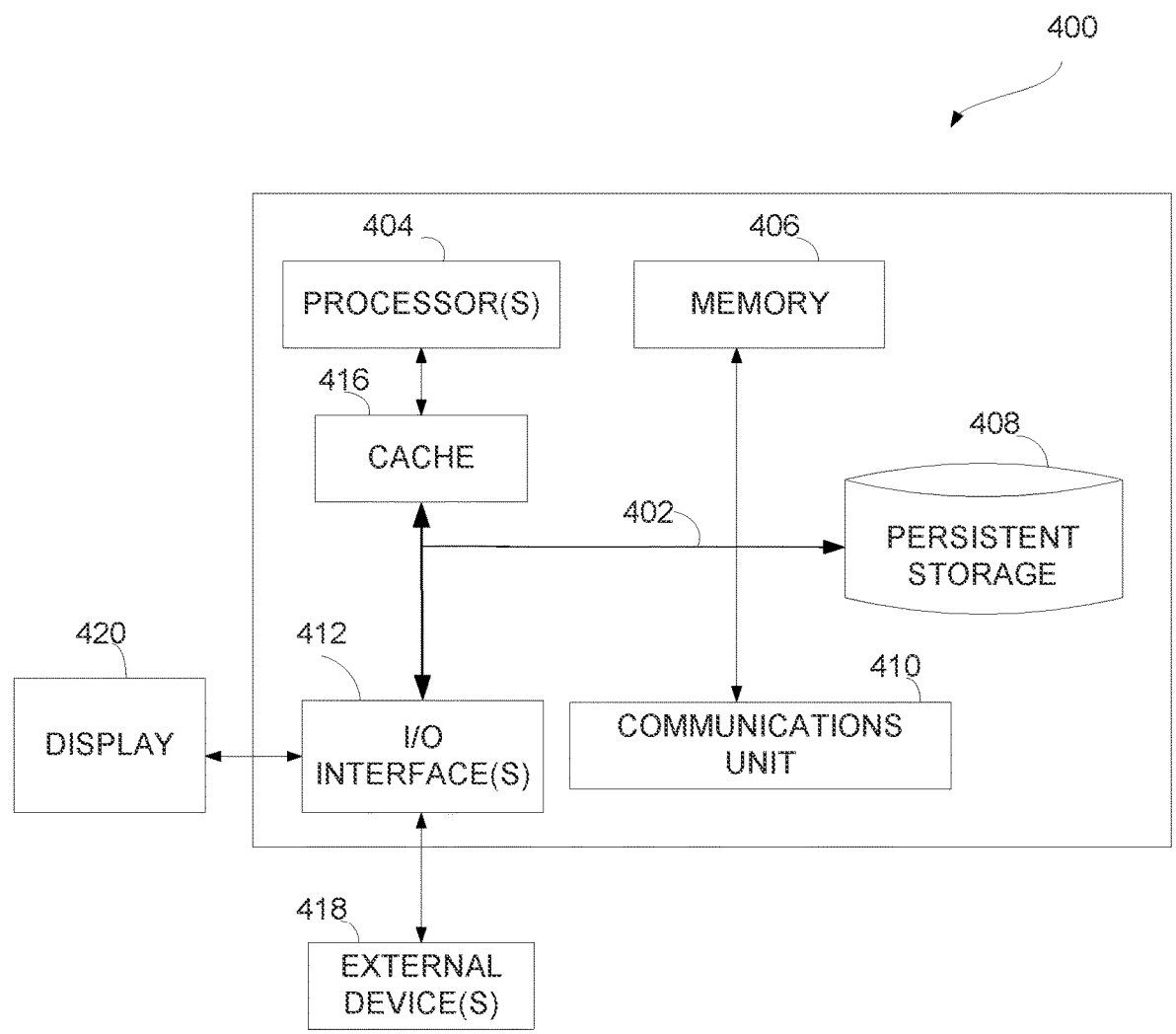
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Analytics module 110 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Analytics module 110 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., analytics module 110 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
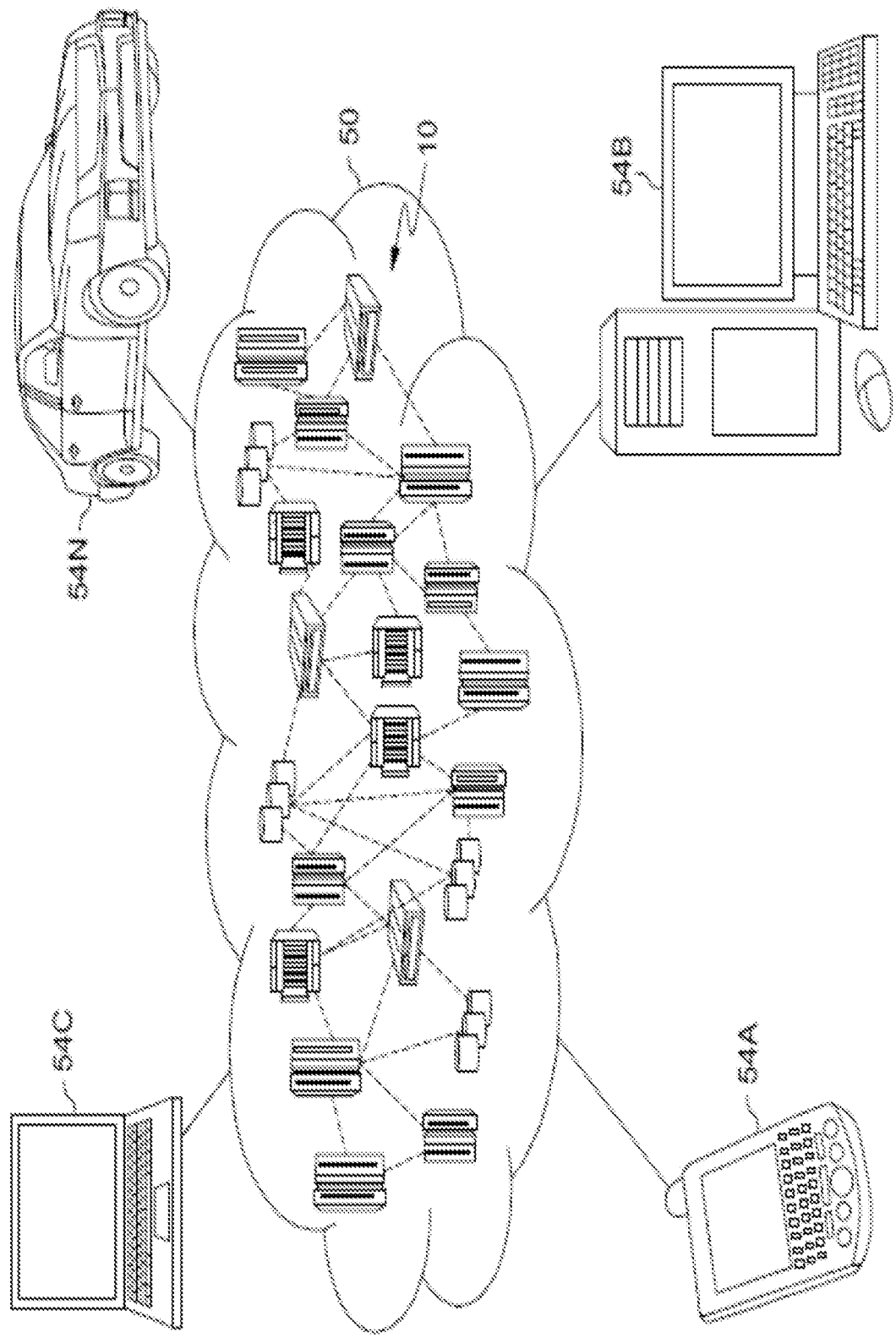
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
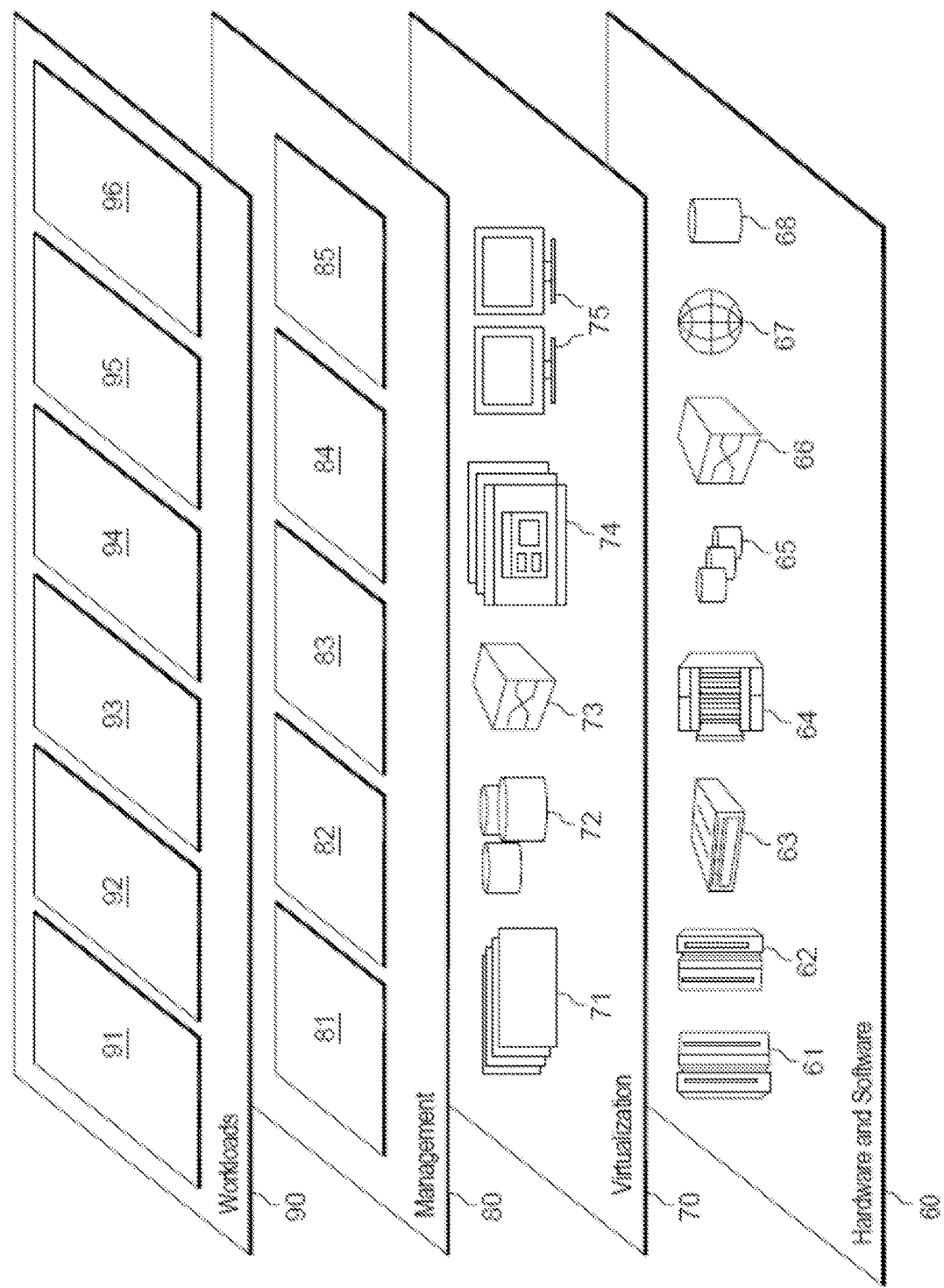
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, analytics module 110 as described above with respect to privacy trade-off analytics environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, by one or more processors, a dataset for training a model, the dataset including one or more pre-identified sensitive data fields;
determining, by one or more processors, a weight of each sensitive data field for the model;
evaluating, by one or more processors, resource cost of applying a privacy preservation technique to the one or more pre-identified sensitive data fields;
identifying, by one or more processors, correlation among the sensitive data fields; and
presenting, by one or more processors, a comparison of options for training the model, in terms of tradeoffs of accuracy for training the model and the resource cost of the privacy preservation technique.

2. The computer-implemented method of claim 1, wherein a sensitivity level of the sensitive data fields is defined as in a range between 0 and 1, where 0 is the least sensitive and 1 is the most sensitive.

3. The computer-implemented method of claim 1, further comprising:
  replacing, by one or more processors, features that have been declared as more sensitive features with less sensitive features; and
  proceeding, by one or more processors, with training the model.

4. The computer-implemented method of claim 1, wherein the privacy preservation technique includes excluding a column and securing multi-party computation and differential privacy.

5. The computer-implemented method of claim 1, further comprising:
  ranking, by one or more processors, the sensitive data fields based on the correlation.

6. The computer-implemented method of claim 1, wherein the sensitive data fields include information selected from the group consisting of: personally identifying information, private health information, and business sensitive information.

7. The computer-implemented method of claim 1, wherein the resource cost of the privacy preservation technique is associated with computational resources and speed of computation of applying the privacy preservation technique to the pre-identified sensitive data fields.

8. A computer program product comprising:
  one or more computer readable storage media, and program instructions collectively stored on the one or more computer readable storage media, the program instructions comprising:
  program instructions to receive a dataset for training a model, the dataset including one or more pre-identified sensitive data fields;
  program instructions to determine a weight of each sensitive data field for the model;
  program instructions to evaluate resource cost of applying a privacy preservation technique to the one or more pre-identified sensitive data fields;
  program instructions to identify correlation among the sensitive data fields; and
  program instructions to present a comparison of options for training the model, in terms of tradeoffs of accuracy for training the model and the resource cost of the privacy preservation technique.

9. The computer program product of claim 8, wherein a sensitivity level of the sensitive data fields is defined as in a range between 0 and 1, where 0 is the least sensitive and 1 is the most sensitive.

10. The computer program product of claim 8, further comprising:
  program instructions to replace features that have been declared as more sensitive features with less sensitive features; and
  program instructions to proceed with training the model.

11. The computer program product of claim 8, wherein the privacy preservation technique includes excluding a column and securing multi-party computation and differential privacy.

12. The computer program product of claim 8, further comprising:
  program instructions to rank the sensitive data fields based on the correlation.

13. The computer program product of claim 8, wherein the sensitive data fields include information selected from the group consisting of: personally identifying information, private health information, and business sensitive information.

14. The computer program product of claim 8, wherein the resource cost of the privacy preservation technique is associated with computational resources and speed of computation of applying the privacy preservation technique to the pre-identified sensitive data fields.

15. A computer system comprising:
  one or more computer processors, one or more computer readable storage media, and program instructions stored on the one or more computer readable storage media for execution by at least one of the one or more computer processors, the program instructions comprising:
  program instructions to receive a dataset for training a model, the dataset including one or more pre-identified sensitive data fields;
  program instructions to determine a weight of each sensitive data field for the model;
  program instructions to evaluate resource cost of applying a privacy preservation technique to the one or more pre-identified sensitive data fields;
  program instructions to identify correlation among the sensitive data fields; and
  program instructions to present a comparison of options for training the model, in terms of tradeoffs of accuracy for training the model and the resource cost of the privacy preservation technique.

16. The computer system of claim 15, wherein a sensitivity level of the sensitive data fields is defined as in a range between 0 and 1, where 0 is the least sensitive and 1 is the most sensitive.

17. The computer system of claim 15, further comprising:
  program instructions to replace features that have been declared as more sensitive features with less sensitive features; and
  program instructions to proceed with training the model.

18. The computer system of claim 15, wherein the privacy preservation technique includes excluding a column and securing multi-party computation and differential privacy.

19. The computer system of claim 15, further comprising:
  program instructions to rank the sensitive data fields based on the correlation.

20. The computer system of claim 15, wherein the sensitive data fields include information selected from the group consisting of: personally identifying information, private health information, and business sensitive information.

* * * * *